Feb. 4, 1936.  G. G. DAY  2,029,467
DISTILLATION OF AMMONIA FROM AQUEOUS AMMONIACAL BRINES
Filed June 7, 1934
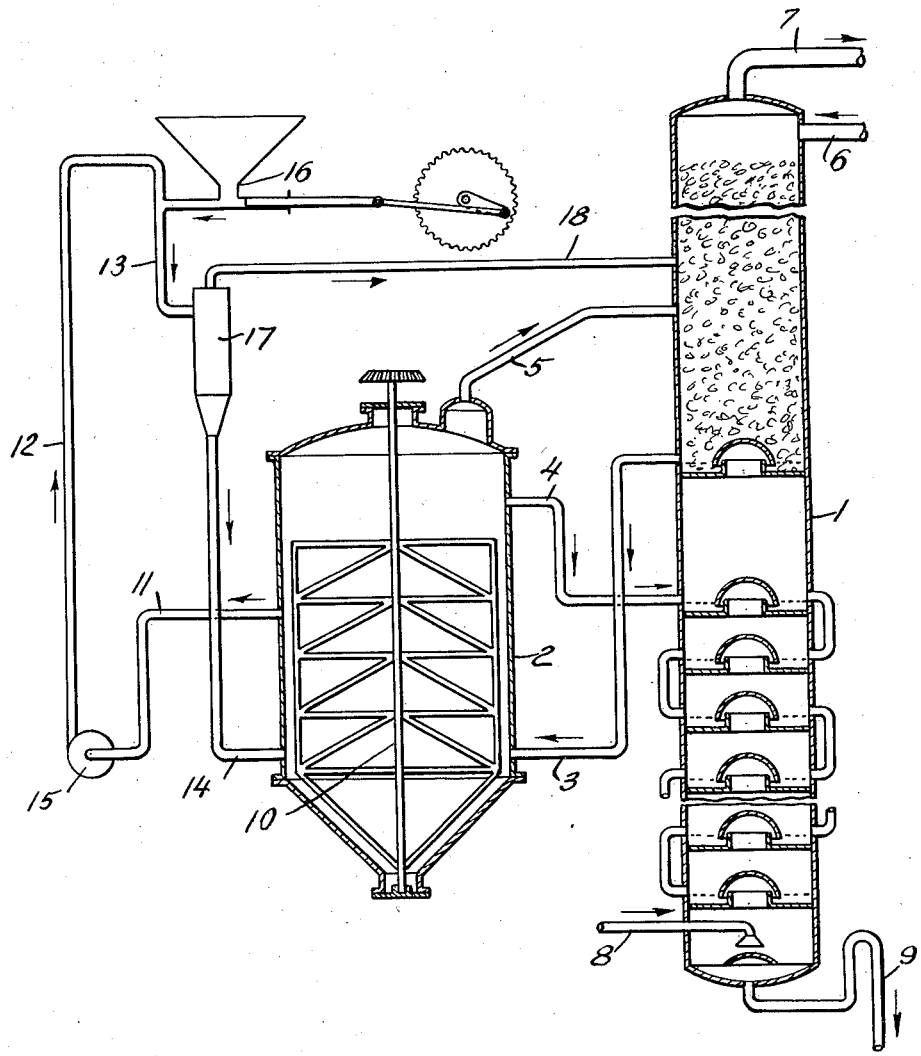
INVENTOR
*George Gerald Day*
BY
*Pennie, Davis, Marvin & Edmonds*
ATTORNEYS Patented Feb. 4, 1936

2,029,467

UNITED STATES PATENT OFFICE 2,029,467

DISTILLATION OF AMMONIA FROM AQUEOUS AMMONIACAL BRINES

George Gerald Day, North Holston, Va., assignor to The Mathieson Alkali Works, Inc., New York, N. Y., a corporation of Virginia Application June 7, 1934, Serial No. 729,391

8 Claims. (Cl. 202—57)

This invention relates to improvements in the distillation of ammonia from aqueous ammoniacal brines involving, as in the distillation of ammonia from ammonium carbonate-ammonium chloride brines in the ammonia soda process, the addition of lime to the brine to liberate ammonia.

Originally, in the ammonia soda process, the distillation of ammonia from the ammoniacal brine was accomplished by the addition of dry lime to the brine in a batch operation. Although the use of dry lime in this distillation, as compared to the use of milk of lime, affords important advantages with respect to heat economy, recovery of ammonia and increase in effective capacity of the apparatus used, the use of milk of lime has been generally adopted in continuous operation because of lack of a workable method of using dry lime in continuous operation.

The reaction between dry lime and ammoniacal brines, containing fixed ammonium compounds such as ammonium chloride for example, proceeds with extreme rapidity, with correspondingly rapid evolution of gas, and is accompanied by the formation of a hard scale. Difficulties originating with such gas evolution or with such scale formation have been so persistent that the use of milk of lime in continuous operation has become, for practical purposes, standard practice notwithstanding the loss of heat and loss of capacity involved in heating and handling the water content of milk of lime so used.

This invention provides a method of using dry lime in such distillation of ammonia from aqueous ammoniacal brines which avoids difficulties due to gas evolution and scale formation, which is workable in conjunction with continuous operations and which secures the advantages previously mentioned with respect to heat economy, recovery of ammonia and increase in effective capacity of the apparatus used.

In the recovery of ammonia from ammonium carbonate-ammonium chloride brines in the ammonia soda process, as conventionally practiced, for example, ammonia including ammonia liberated by thermal decomposition of ammonium carbonate is distilled from the brine in the upper part of the distillation column, the brine stripped of such ammonia but containing ammonium chloride is circulated from the upper part of the distillation column to a reaction vessel, or pre-limer, to which lime is supplied as milk of lime to effect the decomposition of fixed ammonium compounds, and the brine from the reaction vessel is circulated to the lower part of the distillation column where the brine is stripped of ammonia liberated by such decomposition, this operation, including the supply of milk of lime to the reaction vessel, being conducted as a continuous operation.

In accordance with this invention, lime required to effect decomposition of fixed ammonium compounds is supplied to the reaction vessel, in apparatus corresponding to that conventionally used, in the form of a slurry, but instead of being supplied to the reaction vessel in the form of milk of lime as in conventional practice, it is supplied in the form of a slurry produced by introducing dry lime into liquor withdrawn from the reaction vessel at a point such that, with respect to the withdrawn liquor, reaction between lime and fixed ammonium compounds is substantially complete and consequently such that the withdrawn liquor is substantially inert with respect to lime, this liquor with the introduced lime being returned to the reaction vessel. To assure completion of the decomposition reaction within the reaction vessel, lime is supplied to the reaction vessel at a rate sufficient to provide, in the reaction vessel, an excess of lime over that required for the decomposition reaction. Thus, although the lime is introduced as dry lime, it reaches the zone of reaction in the reaction vessel in the form of a slurry, and without requiring any addition of extraneous water.

In accordance with this invention the aqueous ammoniacal brine, containing fixed ammonium compounds, is circulated from a distillation column to a reaction vessel, a liquid body containing free lime is maintained in the reaction vessel, liquor substantially inert with respect to lime is withdrawn from the liquid body in the reaction vessel, dry lime is introduced into this withdrawn liquor and the withdrawn liquor with introduced lime is then returned to the liquid body in the reaction vessel, and brine is circulated from the reaction vessel to the distillation column. A stream of liquor substantially inert with respect to lime, withdrawn from the liquid body in the reaction vessel, is advantageously maintained in circulation through an external circuit discharging into the liquid body in the reaction vessel, dry lime being introduced into the stream of liquor circulating through this external circuit. Also, in so introducing dry lime into a stream of liquor circulating through such an external circuit, a pressure lower than that prevailing in the reaction vessel and better a subatmospheric pressure is with advantage maintained at that point in the external circuit at which the dry lime is introduced into the circulating stream. Any gas liberated following the introduction of lime into such circulating stream is, with advantage, separated from the circulating stream of liquor prior to discharge into the liquid body in the reaction vessel.

One form of apparatus adapted for use in practicing the invention is illustrated, diagrammatically and conventionally, in elevation and partly in section and with parts broken away, in the accompanying drawing, in connection with which the invention will be further described.

Referring to the drawing, the apparatus illustrated comprises a distillation column 1, a reaction vessel 2, a connection 3 for circulating brine from the distillation column to the reaction vessel, a connection 4 for circulating brine from the reaction vessel to the distillation column, and connection 5 for discharging gas from the reaction vessel to the distillation column. The distillation column and the associated reaction vessel may, for example, be the conventional apparatus for the distillation of ammonia from ammoniacal brines as used in conventional practice of the ammonia soda process. The ammoniacal brine, containing ammonium carbonate and ammonium chloride for example, is supplied to the upper end of the distillation column through connection 6, the ammonium carbonate content of the brine is decomposed by heat in the upper part of the column, and the ammonium chloride content of the brine is decomposed, by the addition of lime, in the reaction vessel 2, and to some extent, in some cases, in the lower part of the column, the liberated ammonia is discharged to recovery apparatus through connection 7, the ammonia liberated in the reaction vessel 2 being discharged into the upper part of the column through connection 5, steam to effect the distillation is supplied through connection 8 and the brine stripped of ammonia is discharged from the lower end of the column through connection 9, the operation being substantially continuous. The reaction vessel 2 contains the conventional agitator 10.

The apparatus illustrated also comprises connections 11, 12, 13 and 14 including a pump 15, lime feeding mechanism 16, a gas separator 17 and connection 18 in addition to the conventional apparatus so far described. Connections 11, 12, 13 and 14 form an external circuit through which liquor, withdrawn from the reaction vessel 2 through connection 11, is circulated to be discharged into the reaction vessel 2 through connection 14. Any gas liberated following the introduction of lime into connection 13, by means of the lime feeding mechanism 16, is separated in the gas separator 17 and discharged into the upper part of the distillation column 1 through connection 18. The illustrated mechanism for introducing dry lime into the stream of liquor circulating through the external circuit including connection 13 is of conventional plunger type. Screw feeding mechanism, or any other appropriate feeding mechanism, may be used in its place. The gas separator illustrated is of conventional type.

In carrying out the invention in the apparatus illustrated, the ammoniacal brine from the upper part of the distillation column, including fixed ammonium compounds, is discharged into the lower part of the reaction vessel 2 through connection 3. A liquid body containing free lime is maintained in the reaction vessel 2 by supplying dry lime, by means of the feeding mechanism 16, at a rate, with respect to the rate at which brine is supplied to the reaction vessel 2 from the distillation column and with respect to the concentration of fixed ammonium compounds in such brine, sufficient to maintain in the liquid body in the reaction vessel 2 an excess, which need be but a slight excess, of lime to effect the decomposition of fixed ammonium compounds in the brine circulating to the reaction vessel 2 from the distillation column 1. The liquor to which the dry lime is introduced, in connection 13, is withdrawn from the liquid body in the reaction vessel, through connection 11, at a point such that it is substantially inert with respect to lime. The lime slurry formed by the introduction of dry lime into this liquor is introduced into the reaction vessel 2 through connection 14. Since the liquor into which the dry lime is introduced is substantially inert with respect to lime, both evolution of gas and formation of scale at any point in the external circuit comprising connections 11, 12, 13 and 14 are reduced to a minimum and the decomposition reaction is confined, almost entirely, to the reaction vessel 2. This result is assured by maintaining free lime present in the liquid body in the reaction vessel 2. Any small amount of gas liberated following the introduction of lime into the stream of liquor circulating through the external circuit comprising connections 11, 12, 13 and 14 is separated from this stream by means of the gas separator 17. Any small amount of scale formed is carried on into the reaction vessel by the circulation maintained through this external circuit. Brine overflows from the upper part of the liquid body maintained in the reaction vessel 2 to the lower part of distillation column 1 through connection 4.

The arrangement of apparatus illustrated is particularly advantageous and makes it possible to carry out the operation in a particularly advantageous way. The loop at the upper end of connection 12 may be arranged at a height of about 33 feet above the normal liquid level in a reaction vessel 2, that is above the outlet to connection 4, and the point of introduction of dry lime may be arranged about one foot below the highest point of this loop. With this arrangement, effective circulation can be maintained through the external circuit comprising connections 11, 12, 13 and 14 while maintaining, at the point of introduction of the dry lime a pressure low enough, lower than that prevailing in the reaction vessel and even lower than atmospheric pressure, to minimize any tendency toward leakage of the circulating liquor at this point. The pressure at the point of lime introduction is, with this arrangement, readily controlled by regulating the rate of circulation through the external circuit. The lower end of the gas separator is with advantage arranged at a point sufficiently above the normal liquid level in the reaction vessel 2 to insure effective liquid circulation from the gas separator 17 back to the reaction vessel 2 through connection 14.

The dry lime introduced into the stream of liquor circulating through connections 11, 12, 13 and 14 may be supplied either as hydrated lime, in a fine state of subdivision, or as pulverulent quicklime. The immediate return of this liquor to the reaction vessel 2, as in the apparatus illustrated, also makes available, for the purposes of the decomposition effected in the reaction vessel, any heat liberated as heat of hydration of lime so introduced. It will be understood that the various parts of the apparatus are thermally insulated to minimize heat loss.

I claim:

1. In the distillation of ammonia from aqueous ammoniacal brines, the improvement which comprises circulating the brine from a distillation column to a reaction vessel, maintaining a liquid body containing free lime in the reaction vessel, withdrawing liquor substantially inert with respect to lime from said body, introducing dry lime into said withdrawn liquor, returning said withdrawn liquor with introduced lime to said body, and returning lime-treated brine from the reaction vessel to said distillation column.

2. In the distillation of ammonia from aqueous ammoniacal brines, the improvement which comprises circulating the brine from a distillation column to a reaction vessel, maintaining a liquid body containing free lime in the reaction vessel, maintaining circulation of a stream of liquor substantially inert with respect to lime withdrawn from said body through an external circuit discharging into said body, introducing dry lime into the stream circulating through said circuit, and circulating lime-treated brine from the reaction vessel to the distillation column.

3. In the distillation of ammonia from aqueous ammoniacal brines, the improvement which comprises circulating the brine from a distillation column to a reaction vessel, maintaining a liquid body containing free lime in the reaction vessel, maintaining circulation of a stream of liquor substantially inert with respect to lime withdrawn from said body through an external circuit discharging into said body, introducing dry lime into the stream circulating through said circuit, separating any gas liberated following the introduction of lime from the stream circulating through said circuit prior to discharge into said body, and circulating lime-treated brine from the reaction vessel to the distillation column.

4. In the distillation of ammonia from aqueous ammoniacal brines, the improvement which comprises circulating the brine from a distillation column to a reaction vessel, maintaining a liquid body containing free lime in the reaction vessel, maintaining circulation of a stream of liquor substantially inert with respect to lime withdrawn from said body through an external circuit including a point at which the pressure is lower than that prevailing in the reaction vessel and discharging into said body, introducing dry lime into the stream circulating through said circuit at said point, and circulating lime-treated brine from the reaction vessel to the distillation column.

5. In the distillation of ammonia from aqueous ammoniacal brines, the improvement which comprises circulating the brine from a distillation column to a reaction vessel, maintaining a liquid body containing free lime in the reaction vessel, maintaining circulation of a stream of liquor substantially inert with respect to lime withdrawn from said body through an external circuit including a point of subatmospheric pressure and discharging into said body, introducing dry lime into the stream circulating through said circuit at said point, and circulating lime-treated brine from the reaction vessel of the distillation column.

6. In the distillation of ammonia from aqueous ammoniacal brines, the improvement which comprises circulating the brine from a free ammonia distillation column to a reaction vessel, maintaining a liquid body containing free lime in the reaction vessel, withdrawing liquor substantially inert with respect to lime from said body, introducing dry lime into said withdrawn liquor, returning said withdrawn liquor with introduced lime to said body, and circulating lime-treated brine from the reaction vessel to a fixed ammonia distillation column.

7. In the distillation of ammonia from aqueous ammoniacal brines, the improvement which comprises circulating the brine from a distillation column to a reaction vessel, maintaining a liquid body containing free lime in the reaction vessel, withdrawing liquor substantially inert with respect to lime from said body, introducing dry lime into said withdrawn liquor, returning said withdrawn liquor with introduced lime to said body, separating and recovering ammonia from the lime-treated brine in the reaction vessel and withdrawing lime-treated brine from the reaction vessel.

8. In the distillation of ammonia from aqueous ammoniacal brines, the steps which comprise circulating ammoniacal brine to a reaction vessel, maintaining a liquid body of ammoniacal brine containing free lime in said reaction vessel, withdrawing liquor substantially inert with respect to lime from said body, introducing dry lime into said withdrawn liquor, and returning said withdrawn liquor with introduced lime to said body, and withdrawing lime-treated brine from said reaction vessel.

GEORGE GERALD DAY.